United States Patent
Diehl

(10) Patent No.: US 8,593,097 B2
(45) Date of Patent: Nov. 26, 2013

(54) SEAT ADJUSTING DEVICE

(75) Inventor: Andreas Diehl, Otterberg (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 277 days.

(21) Appl. No.: 13/003,166

(22) PCT Filed: Jul. 7, 2009

(86) PCT No.: PCT/EP2009/004900
§ 371 (c)(1),
(2), (4) Date: Mar. 10, 2011

(87) PCT Pub. No.: WO2010/003631
PCT Pub. Date: Jan. 14, 2010

(65) Prior Publication Data
US 2011/0266991 A1 Nov. 3, 2011

(30) Foreign Application Priority Data
Jul. 8, 2008 (DE) .......................... 10 2008 032 162

(51) Int. Cl.
*H02P 7/18* (2006.01)
*H02P 23/00* (2006.01)

(52) U.S. Cl.
CPC .................................. *H02P 23/0063* (2013.01)
USPC ........... 318/461; 318/255; 318/256; 318/257; 318/258; 318/259

(58) Field of Classification Search
CPC .................................................. H02P 23/0063
USPC .......................................... 318/461, 255–259
See application file for complete search history.

(56) References Cited

U.S. PATENT DOCUMENTS

| | | | |
|---|---|---|---|
| 4,922,426 A * | 5/1990 | Obara et al. | 701/49 |
| 6,195,603 B1 * | 2/2001 | Gauger et al. | 701/49 |
| 6,820,895 B2 * | 11/2004 | Levine | 280/735 |
| 7,026,770 B2 * | 4/2006 | Hemphill et al. | 318/9 |
| 7,726,177 B2 * | 6/2010 | Schlesinger et al. | 73/31.02 |
| 8,136,789 B2 * | 3/2012 | Staev | 251/129.12 |

FOREIGN PATENT DOCUMENTS

| | | |
|---|---|---|
| DE | 3527906 A1 | 2/1987 |
| DE | 42 11 428 A1 | 10/1993 |
| DE | 198 60 910 B4 | 7/2000 |
| DE | 101 45 746 A1 | 4/2003 |
| DE | 101 46 144 A1 | 4/2003 |
| DE | 102004056707 A1 | 9/2005 |
| DE | 102004019466 B4 | 11/2005 |
| DE | 102005036332 B4 | 2/2007 |
| WO | WO 01/42040 A | 6/2001 |

* cited by examiner

*Primary Examiner* — Bentsu Ro
*Assistant Examiner* — David Luo
(74) *Attorney, Agent, or Firm* — McGlew and Tuttle, P.C.

(57) ABSTRACT

A seat adjusting device for an automobile seat (1) having an electric motor (11) for generating a drive motion, wherein the electric motor is operationally coupled to a gearbox (13) for transmitting the drive motion thereof, the gearbox having a gearbox housing (19) in which gearbox elements are disposed for a step-up or step-down transmission of the motor drive motion, by means of which electric motors of lesser technical complexity can be used than previously. To this end, the invention proposes that the gearbox (13) has detection device for detecting information about the speed of at least one of the gearbox elements or detecting a variable dependent on the speed.

18 Claims, 2 Drawing Sheets

SEAT ADJUSTING DEVICE

CROSS REFERENCE TO RELATED APPLICATIONS

This application is a United States National Phase application of International Application PCT/EP2009/004900 and claims the benefit of priority under 35 U.S.C. §119 of German Patent Application DE 10 2008 032 162.1 filed Jul. 8, 2008, the entire contents of which are incorporated herein by reference.

FIELD OF THE INVENTION

The invention relates to a seat adjusting device for an automobile seat, having an electric motor for generating a drive motion, wherein the electric motor is operationally coupled to a gearbox for transmitting the drive motion thereof, said gearbox having a gearbox housing in which gearbox elements are disposed for a step-up or step-down transmission of the motor drive motion. Such a generic seat adjusting device is known from DE 10 2004 019 466 B4, the entire contents of which are incorporated herein by reference.

BACKGROUND OF THE INVENTION

Automobile seats, in particular single seats, are generally constructed so as to be adjustable. Here, on the one hand, the seat as a whole can be longitudinally adjustable, for which a seat part of the automobile seat is fastened to an upper track and the upper track is longitudinally displaceable with respect to a lower track fastened on the automobile side.

In addition, usually a backrest part of the automobile seat is swivelably articulated on its seat pan part. The articulation is produced here by fittings which have components on the seat pan part side and also on the backrest part side, which are swivelable or rotatable relative to each other. Several different types of fitting exist for this; detent fittings or tumble fittings are frequently used.

Either a manual or a motor-driven adjustment movement can be provided to carry out the movements of the automobile seat. To produce motor drive motions, generally electric motors are used, in particular electric direct current motors, owing to the direct current network in motor vehicles. As such direct current motors usually provide drive motions with high rotation speeds, which are not able to be used directly as an adjustment movement, a reduction takes place by means of the gearbox. With the reduced movement, the seat or respectively a seat component is adjusted.

In particular for memorized seat functions, such as for example in the case of a stored longitudinal position of the seat with respect to the lower track of the seat or a particular backrest inclination, the electric motors have detection means in order to be able to establish the number of revolutions and/or rotation speed of the motor. This information is used by a control of the seat adjusting device, in order to transfer the seat or its components into the desired stored position. In particular with a plurality of different seats, this can lead to a large number of different electric motors, which involves high costs. In the previously known solutions, in addition it is a disadvantage that owing to the high rotation speeds of the electric motors used hitherto, high scanning frequencies are necessary, which in turn lead to a large amount of data which are to be processed, which in turn make high-performance and expensive evaluation electronics necessary. Furthermore, through the high frequencies, high electromagnetic loads occur, which in turn entail a high expenditure to achieve an immunity to interference in the respectively adjacent assemblies.

Such a seat adjusting device, in which the motor rotation speed is detected and the position of the automobile seat is calculated therefrom, is disclosed in DE 3527906 A1.

SUMMARY OF THE INVENTION

According to a first aspect, the invention is therefore based on the problem of providing a seat adjusting device of the type named in the introduction, which requires electric motors of lesser technical complexity than previously. According to a second aspect of the invention, a seat adjusting device is to be made possible which makes less high-performance evaluation electronics necessary than previous seat adjusting devices for the production of predetermined adjustment paths.

This problem is solved according to the invention in a seat adjusting device of the type named in the introduction in that the gearbox has at least one detection means, such as for example a sensor, to determine the rotation speed of a gearbox member or of a variable dependent on the rotation speed. In addition, evaluation electronics are to be arranged on the gearbox for evaluation for signals provided by the at least one detection means.

Unlike in the previous solutions, in which the detection means are arranged in the motor and require a high scanning frequency owing to the high rotation speeds of the motor shaft, in the solution according to the invention the lower rotation speeds, owing to the reduction taking place in the gearbox, can be used. The rotation speeds, which are usually distinctly lower, lead to lower scanning frequencies, which in turn make a less high-performance evaluation electronics necessary. If, on the other hand, similarly high-performance evaluation electronics are used as hitherto, then calculating capacities for other applications are now available in the evaluation electronics. Furthermore, the disturbance behavior at low frequencies is considerably less, which in turn has a positive effect on the surrounding peripheral electronics.

In addition, the solution according to the invention makes technically less complex motors possible, which are suitable both for automobile seats without memory function and also for seats with memory function. As the detection means, in contrast to previously known solutions, are now advantageously arranged on or in the gearbox instead of on the motor, motors for seat adjusting devices with a memory function can now also be used which have no detection means for determining the rotation speed. As these motors can also be used for seats without memory function, this can be used for a standardization of the electric motors with otherwise different seat adjusting devices. The motor or respectively the drive unit can therefore be provided as a standard component, which can lead to higher numbers of units and hence to lower costs of the individual electric motors. The measure provided according to the invention of providing the evaluation electronics for the evaluation of the signals provided by the at least one detection means in whole or in part on the gearbox and not on the motor also contributes to this. Hereby, the motor is also relieved of functions and can be standardized. It is particularly advantageous here if the at least one detection means is integrated into the evaluation electronics, in particular is arranged on a shared board with the evaluation electronics.

The problem is also solved according to the invention in a seat adjusting device of the type named in the introduction in that an electrical connection for the current supply and/or for data exchange is provided on the gearbox and that in addition the gearbox is provided with means for conveying current from the gearbox to the motor for the current supply of the latter, in particular for its production of a motor drive motion. These measures can be provided alone or in combination with the first aspect of the invention. Also with such a solution it is possible with less technical effort than hitherto to provide a smaller number of different motor types for different seat adjusting devices. Therefore, this aspect according to the invention can also be used to provide both seats with memory function and also seats without memory function with the same motor type. In addition, through the solution according to the invention, in which at least one electrical contact is present on the gearbox, it is simpler than hitherto to form a modular system for various motor- and gearbox embodiments, because an interface can be defined for the current supply and/or for the data exchange between the electric motor and the gearbox. It is preferred here if the electrical contacting of the motor takes place via the gearbox. For this, the gearbox and the motor can be respectively provided with a contact means, which can be connected with each other. The contact means can be connected directly with each other here, and can be constructed for this in the manner of a plug/socket. In other embodiments, the electrical contact means of the gearbox and of the motor can also be connected with each other by line means.

It has proved to be advantageous if the gearbox is also provided with a control unit which is arranged on the gearbox itself. The control unit can advantageously undertake all the control functions which are necessary for carrying out movements of the respective seat. Provision can also be made that the control unit only controls the functions which are necessary for operating the respective drive of the seat adjusting device. It has proved to be advantageous here if the control unit has a board with electronic circuits, with the board being arranged on the gearbox, preferably on the gearbox housing and particularly preferably inside the housing, whereby the control unit is protected from damage and contamination. The control unit can contain both the necessary control electronics and also power electronics for the motor.

In a preferred embodiment of the invention, at least one sensor, constructed as detection means, can be provided on the gearbox, by which information is determined with regard to the rotary movement of a rotatably arranged gearbox member. Such a sensor can advantageously be a sensor using inductive or magnetic effects, such as for example a Hall sensor. The magnets necessary in connection with Hall sensors can be arranged in various ways on the rotating gearbox member, for example can be glued on. However, it is particularly preferred if favorably priced synthetic sintered material is magnetized at predetermined sites of the gearbox member which is provided for this. In this way, the complex measure of the integration of additional magnets is dispensed with. The production methods necessary for this are previously known per se and are offered and carried out for example by the company MS-Schramberg GmbH & Co. KG, D-78713 Schramberg-Sulgen.

The at least one sensor provided for detecting the rotation speed information, preferably a Hall sensor, can be integrated into the control unit, in particular can be arranged on a board of the control unit. The control unit can be advantageously arranged on the gearbox, in particular inside its gearbox housing, such that the at least one magnet runs past the Hall sensor on the rotation of the gearbox member, and this is able to be detected by the Hall sensor.

In principle, any type of gearbox having at least one rotating gearbox element can be used in connection with the seat adjusting device according to the invention. The invention can have for example at least one wobble, planetary, worm or spur gearbox and combinations of these gearbox types. Particular advantages can be achieved with gearboxes which have a high reduction gear ratio because in these gearboxes—compared with the respective rotation speed of the drive motor—particularly low rotation speeds occur. In connection with the present invention, it is therefore expedient if with the detection means the rotation speed or respectively rotation movement is detected of the gearbox element which has the lowest rotation speed in the gearbox. In many cases, this will be the gearbox element on the output side, by which the rotary movement is delivered from the gearbox to the seat element which is to be adjusted.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
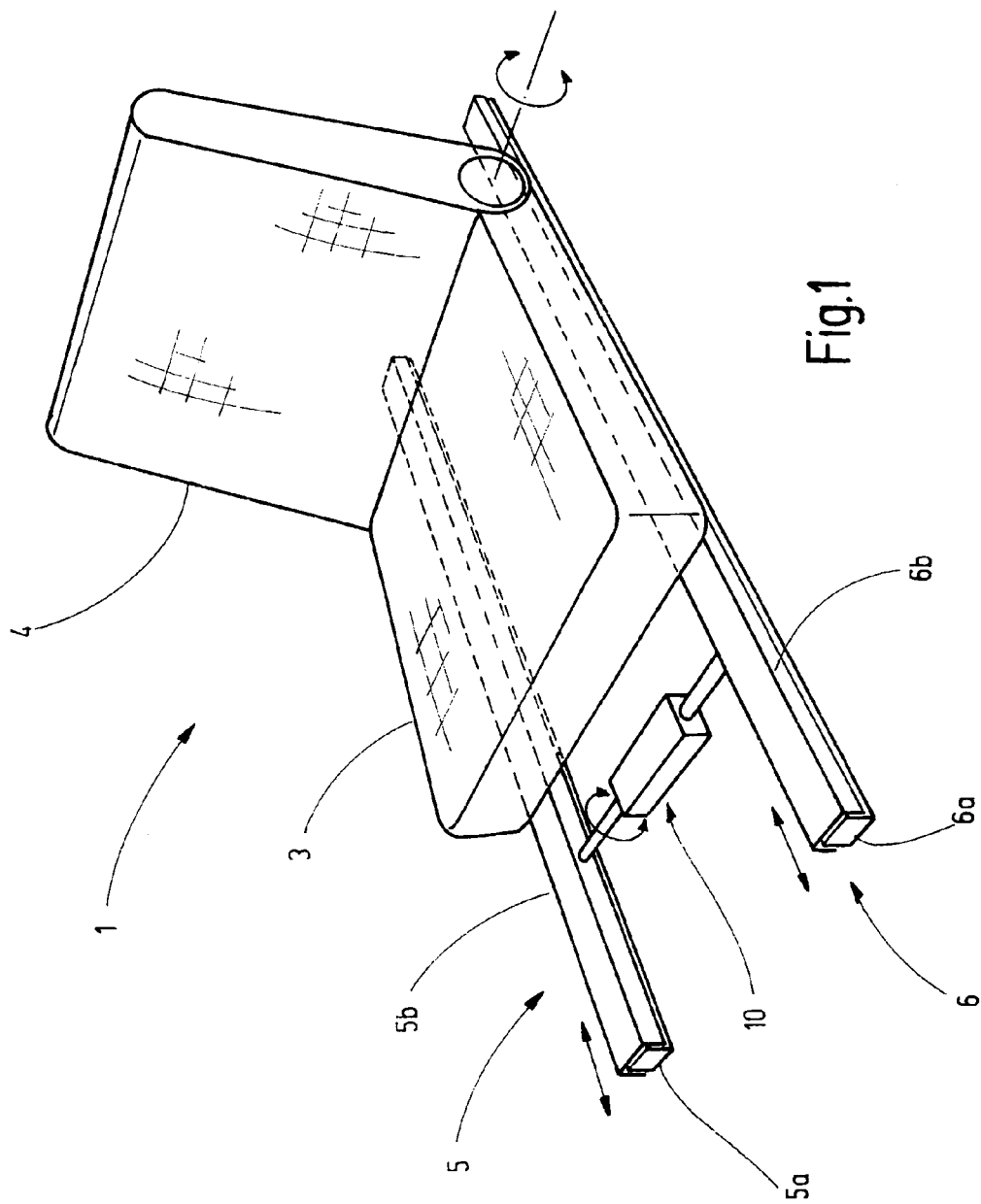
FIG. 1 is a perspective view of an automobile seat with a seat adjusting device according to the invention.

An automobile seat 1 of a motor vehicle has a seat pan part 3 and a backrest 4, which is arranged by means of two fittings laterally on the seat pan part 3, is swivelable relative thereto and is able to be locked with different inclination settings. The alignment of the automobile seat 1 in the motor vehicle and its usual travel direction on the one hand and the symmetry and arrangement of the fittings in the automobile seat 1 on the other hand define the direction indications which are used. The automobile seat is constructed as a seat with integrated seatbelt, i.e. the upper end of a safety belt is fastened to the backrest 4, more precisely to an automatic belt retraction device on the upper edge of the backrest.

For the longitudinal displacement of the seat, the latter is arranged with its seat pan part 3 on two seat track pairs 5, 6 aligned parallel to each other at a distance. Each seat track pair 5, 6 has a lower track 5a, 6a fastened on the automobile floor, and an upper track 5b, 6b guided on the seat lower track 5a, 6a and longitudinally displaceable relative thereto. Each seat upper track 5b, 6b is operationally coupled to an electric seat adjusting device 10 according to the invention. Here, in an embodiment a shared seat adjusting device 10 can be provided for both seat track pairs. In alternative embodiments to this, each seat track pair 5, 6 can have its own seat adjusting device associated with it. In the latter case, a coupling of the movements of the two seat upper tracks can be provided, in particular a mechanical coupling or an electronic coupling of the two motors of the seat adjusting devices, as is described for example in DE 198 60 910 B4, the entire contents of which are incorporated herein by reference.

Figure 2:
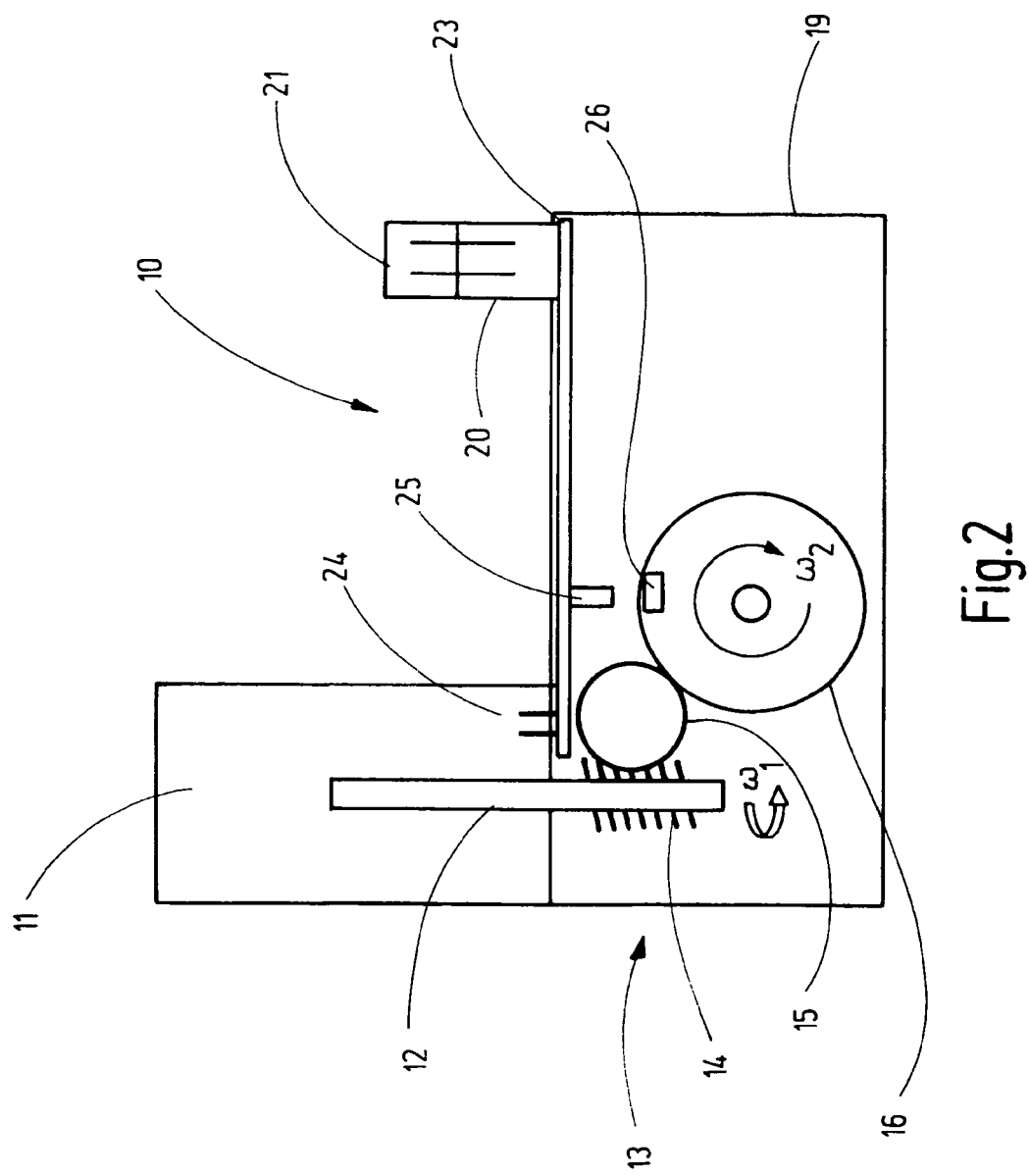
FIG. 2 is a highly diagrammatic view of a basic representation of a seat adjusting device according to the invention.

The seat adjusting device according to the invention has a direct current electric motor 11, shown in FIG. 2, the drive shaft 12 of which is operationally coupled to a reduction gearbox 13. The reduction gearbox 13 of the example embodiment is connected with at least one of the upper tracks 5b, 6b and has a worm 14 on the input side, which meshes with a worm wheel 15. The worm wheel 15 in turn meshes with a spur cogwheel 16, which is arranged on a drive shaft on the gearbox side. In addition, a further cogwheel which is not illustrated in the figures is arranged on the output shaft, which cogwheel is in engagement with a rack of the lower track. The rotary movement of the drive motor 11 therefore leads to a reduction of the drive motion, preferably in a ratio of a range of 150:1 to 250:1, which in turn leads to a translatory movement of the upper tracks 5b, 6b and hence of the seat in the longitudinal direction of the automobile.

As can be seen in particular from FIG. 2, the gearbox 13 has a housing 19, on the outer side of which a first electrical contact plug 20 is provided, which can be constructed as a bus contact plug. Via the bus cable 21, which is able to be connected to the bus contact plug 20, the gearbox housing 19 can be connected with an electrical energy source, in particular a car battery, and with an actuating element, for example a switch. In different embodiments than the one illustrated, the gearbox can also be connected with an external control of the seat adjusting device by means of the bus contact plug 20.

By means of the actuating element, which is not illustrated and is situated outside the gearbox in a favorable operating position, an adjustment movement which is to be carried out to the seat adjusting device, i.e. a kind of run command for the electric motor, can be triggered by the user of the seat, corresponding to particular numbers of revolutions of each of the gearbox elements. The bus contact plug 20 is connected in turn with an electronic circuit arranged in the gearbox housing 19, which has the function of a control for the seat adjusting device. The electronic circuit can be arranged on a board 23 which is fastened on the inner side of the gearbox housing. The board 23 is situated here directly opposite the spur cogwheel 16, the gearbox element which moves with the lowest rotation speed in the gearbox.

The gearbox housing 19 has a second contact plug 24, by which the motor 11 is able to be connected electrically with the gearbox housing 19. For this, the electric motor 11 with its housing 19 is preferably connected directly on the contact plug 24 of the gearbox housing using suitable contact means. Alternatively, this can also take place with the use of a cable. The second contact plug 24 is either connected directly with the first contact plug or electrically via the board 23, whereby a connection of the electric motor 11 to the on-board network of the automobile takes place for the current supply. The electric motor 11 therefore obtains the energy necessary for its drive via the gearbox.

A Hall sensor 25, constructed as a Hall IC, is arranged on the board as detection means, which is situated hereby in the immediate vicinity of the spur cogwheel 16 arranged on the output side in the gearbox. The spur cogwheel 16 is manufactured from a sintered material, for example a synthetic sintered material, which makes it possible that locally limitedly magnetic material can also be integrated into the material of the spur cogwheel in this example embodiment. In this way, one or more magnets 26 can be integrated into the spur wheel, wherein in the case of several magnets 26, these are preferably to be distributed uniformly on the periphery. In this way, the rotary movement of the spur cogwheel 16 can be scaled further. Depending on the number of magnets which are introduced per revolution, a pulse frequency can be adapted with respect to the increments per revolution of the respective reduction stage. An increase to the release can also be achieved by several sensors which are preferably arranged distributed uniformly on the periphery of the spur cogwheel 16.

In this example embodiment, impulses are therefore generated by means of the Hall sensor 25 and the at least one magnet 26 on the spur cogwheel 16 as a function of the rotation speed of the spur cogwheel 16, which is supplied to the electronic circuit integrated into the gearbox and arranged on the board 23. There, the rotation speed measurement, based on the Hall sensor, is evaluated. As a function of the measured Hall sensor increments, the respectively desired reaction can take place from the electronic circuit, in order to thereby control the motor. With this control, the rotation speed of the electric motor can be controlled in particular by means of the measured number of revolutions of the spur wheel 16. Here, a rotation speed regulation of the motor based on pulse width modulation (PWM) is preferred. Likewise, with the determined rotation speed or number of revolutions of the spur wheel 16, a traveling distance of the seat of predetermined length can also be controlled and hence produced. The length of the traveling distance is produced here by means of a calibration of the predetermined number of revolutions of the spur wheel with the measured actual number of revolutions of the spur wheel 16. As soon as this predetermined number of revolutions has been covered, the motor is stopped by the control.

In other embodiments, the number of revolutions of the spur wheel or of another gearbox member can be used as the applicably determinative variable for covering a predetermined rotation angle by a rotatably or swivelably adjustable component of an automobile seat. The structure and the mode of operation of such a seat adjusting device can basically correspond to the structure shown in FIG. 2. In contrast to the example embodiment previously discussed, in the case of a backrest adjustment the rotary movement of the spur wheel is not converted into a translatory movement, but rather is used as a rotary movement.

While specific embodiments of the invention have been described in detail to illustrate the application of the principles of the invention, it will be understood that the invention may be embodied otherwise without departing from such principles.

List of Reference Numbers
1 automobile seat
3 seat pan part
4 backrest
5 seat track pair
5a seat lower track
5b seat upper track
6 seat track pair
6a seat lower track
6b seat upper track
10 seat adjusting device
11 electric motor
12 drive shaft
13 gearbox
14 worm
15 worm wheel
16 spur cogwheel
19 gearbox housing
20 contact plug
21 bus cable
23 board
24 contact plug
25 Hall sensor
26 magnet

The invention claimed is:
1. A seat adjusting device for an automobile seat, comprising:
an electric motor for generating a drive motion;

gearbox elements;
evaluation electronics;
a gearbox, wherein said electric motor is operationally coupled to said gearbox for transmitting the drive motion thereof, said gearbox having a gearbox housing, in which said gearbox elements are disposed for a step-up or step-down transmission, said gearbox having at least one detection means for one of detecting information relating to a rotation speed of at least one of said gearbox elements and detecting a variable dependent on the rotation speed, said evaluation electronics being arranged on said gearbox for evaluation of signals provided by said at least one detection means, wherein at least one signal generator is arranged on at least one of said gearbox elements provided for the rotary movement, said at least one signal generator being arranged on a gearbox element which is provided for the rotary movement with a rotation speed that is less than a rotation speed of a motor drive shaft of said electric motor.

2. A seat adjusting device according to claim 1, wherein the at least one detection means is integrated into the evaluation electronics, said at least one detection means being arranged on a shared board with said evaluation electronics.

3. A seat adjusting device according to claim 1, wherein a control and/or power electronics of the seat adjusting device is arranged on said gearbox.

4. A seat adjusting device according to claim 3, wherein said control and/or power electronics of the seat adjusting device is arranged inside the gearbox housing.

5. A seat adjusting device according to claim 1, wherein said at least one signal generator is arranged on one or more of said gearbox elements which rotates with a lowest rotation speed in the gearbox on a rotary movement of the gearbox elements.

6. A seat adjusting device according to claim 1, wherein said at least one detection means is arranged inside said gearbox housing.

7. A seat adjusting device according to claim 1, wherein said evaluation electronics are arranged inside said gearbox housing.

8. A seat adjusting device according to claim 1, further comprising:
a connection for connecting said gearbox to one or more of a current supply and a control; and
a connection for an electrical contacting of said gearbox with said electric motor.

9. A seat adjusting device for an automobile seat, comprising:
a gearbox comprising a gearbox housing and gearbox elements, said gearbox elements being arranged in said gearbox housing, said gearbox comprising at least one detection means for detecting one of data corresponding a rotational speed of at least one of said gearbox elements and for detecting a variable dependent on said rotational speed of said at least one of said gearbox elements;
an electric motor, said gearbox elements being connected to said electric motor for stepping-up or stepping-down of power transmitted via said electric motor;
at least one electrical connection provided on the gearbox for one or more of current supply and data exchange; and
a means arranged on said gearbox for supplying current to said electric motor.

10. A seat adjusting device according to claim 9, wherein said at least one electrical connection for current supply is arranged on said gearbox housing.

11. A seat adjusting device according to claim 9, wherein said gearbox communicates via wired or wireless data line means with a control of the seat adjusting device.

12. A seat adjusting device according to claim 9, wherein said gearbox comprises an evaluation device, said evaluation device being arranged on said gearbox housing, said evaluation device receiving said data, said evaluation device evaluating said data such that said evaluation device determines said rotational speed of said at least one of said gearbox elements based on said data to provide an evaluated rotational speed of said at least one of said gearbox elements, wherein said electric motor is controlled based on said evaluated rotational speed of said at least one of said gearbox elements.

13. A seat adjusting device for an automobile seat, comprising:
an electric motor;
a plurality of gearbox elements;
a control element comprising an evaluating device;
a gearbox comprising a gearbox housing, said electric motor being coupled to said gearbox elements, said plurality of gearbox elements stepping up or stepping down power transmitted by said electric motor, said plurality of gearbox elements being arranged in said gearbox housing;
a detection means arranged in said gearbox housing for one of detecting data corresponding to a rotational speed of at least one of said gearbox elements and detecting a variable dependent on said rotational speed of said at least one of said gearbox element, said control element being arranged on said gearbox, said evaluating device receiving said one of said data corresponding to said rotational speed of said at least one of said gearbox elements and said variable dependent on said rotational speed of said at least one of said gearbox elements, said evaluating device determining said rotational speed of said at least one of said gearbox elements based on said one of said data corresponding to said rotational speed of said at least one of said gearbox elements and said variable dependent on said rotational speed of said at least one of said gearbox elements to provide a determined rotational speed of said at least one of said gearbox elements, said control element controlling said electric motor based on said determined rotational speed.

14. A seat adjusting device according to claim 13, wherein said detection means is integrated into said control element, said detection means being arranged on a shared board with said control element.

15. A seat adjusting device according to claim 13, further comprising a signal generator, wherein at least one said signal generator is arranged on at least one of said gearbox elements provided for rotary movement.

16. A seat adjusting device according to claim 15, wherein said at least one signal generator is arranged on one of said gearbox elements, said one of said gearbox element being provided for rotary movement with a rotation speed that is less than a rotational speed of a motor drive shaft of said electric motor.

17. A seat adjusting device according to claim 13, further comprising:
a connection for connecting said gearbox to one or more of a current supply and an actuating device; and
a connection for an electrical contacting of said gearbox with said electric motor.

18. A seat adjusting device for an automobile seat, comprising:
an electric motor for generating a drive motion;
gearbox elements;

evaluation electronics;
a gearbox, wherein said electric motor is operationally coupled to said gearbox for transmitting the drive motion thereof, said gearbox having a gearbox housing, in which said gearbox elements are disposed for a step-up or step-down transmission, said gearbox having at least one detection means for one of detecting information relating to a rotation speed of at least one of said gearbox elements and detecting a variable dependent on the rotation speed, said evaluation electronics being arranged on said gearbox for evaluation of signals provided by said at least one detection means, wherein at least one signal generator is arranged on at least one of said gearbox elements provided for the rotary movement, said at least one signal generator being arranged on one or more of said gearbox elements which rotates with a lowest rotation speed in the gearbox on a rotary movement of the gearbox elements.

* * * * *